United States Patent Office 3,257,812
Patented June 28, 1966

3,257,812
DISSOCIATED AMMONIA SEPARATION PLANT HAVING AN ADSORBER IN A LIQUID REFRIGERANT BATH
Sidney Shaievitz, Yonkers, N.Y., assignor to North American Philips Company, Inc., New York, N.Y., a corporation of Delaware
Filed Apr. 27, 1962, Ser. No. 190,617
12 Claims. (Cl. 62—18)

The present invention relates to a simplified dissociated ammonia separation plant and a method for producing high purity hydrogen.

An object of the present process is to realize a high hydrogen recovery in the order of 95%. Only that hydrogen dissolved in liquid nitrogen at an elevated pressure is lost.

A principal object of the present invention is the process of cooling of gaseous $N_2$–$H_2$ mixture to liquid nitrogen temperatures with the condensation of most of the nitrogen present in the mixture, the separation of the vapor from the condensed nitrogen, the removal of the remainder of the nitrogen by adsorption at low temperatures, and the isothermal regeneration of the adsorbers.

Another object of the present invention is to provide two alternately operable ammonia adsorbers, each having an adsorbent therein, such as a molecular sieve, which are operated cyclically to remove traces of undissociated ammonia and moisture that may be present in the feed. While one adsorber is on stream the other adsorber is being regenerated with nitrogen blowoff.

Another object of the present invention is the provision of a heater with a thermostat which defrost any stray $NH_3$ that may happen to pass through the adsorbers and clog the lines.

A further object of the present invention is the provision of a separator-surge vessel in which the vapor is separated from the nitrogen liquid.

Another object of the present invention is the simplified construction of a dissociated ammonia separation plant utilizing a cold gas refrigerator as the cold source and which plant and process is reliably effective for the purposes intended.

Figure 1:
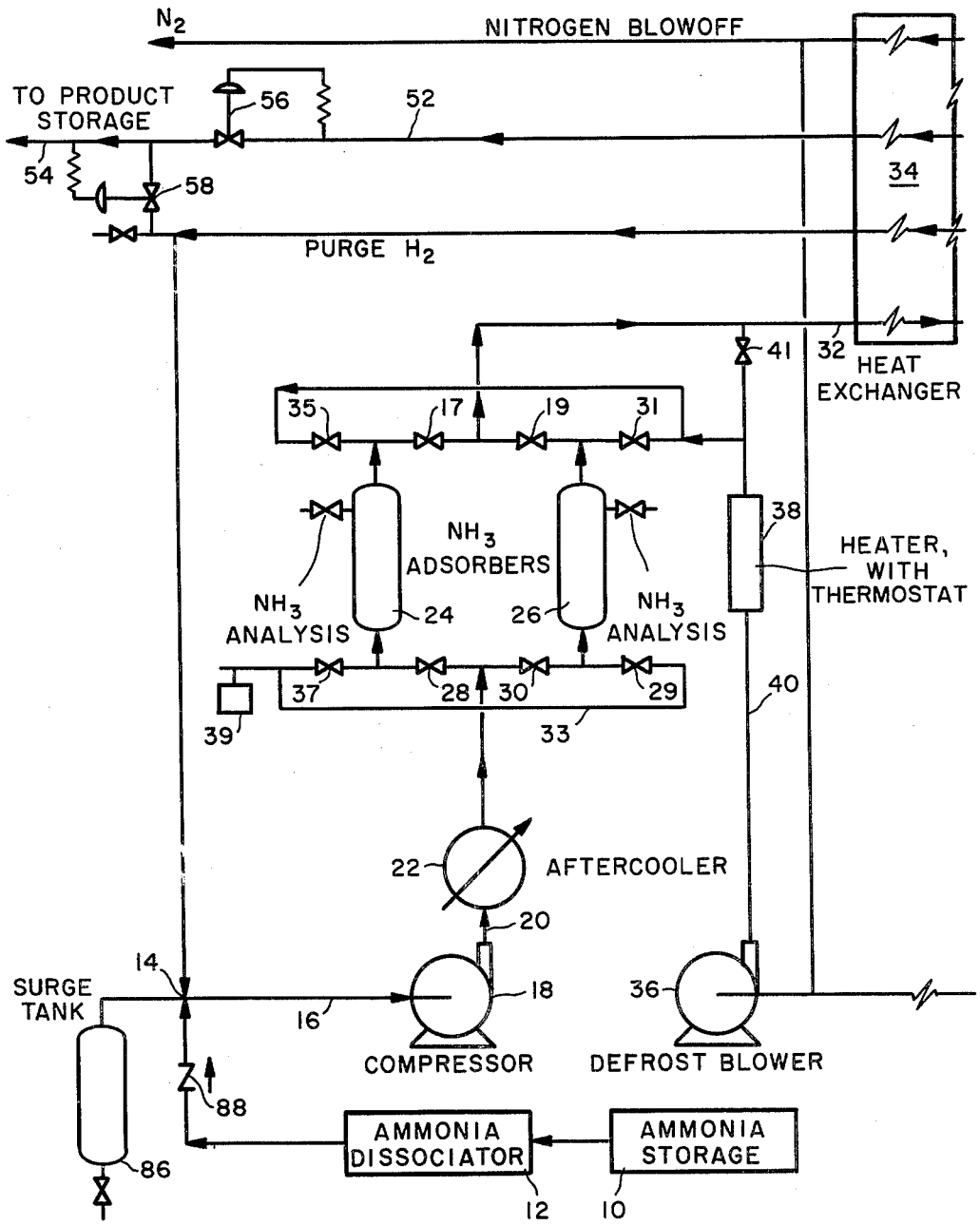
Figure 2:
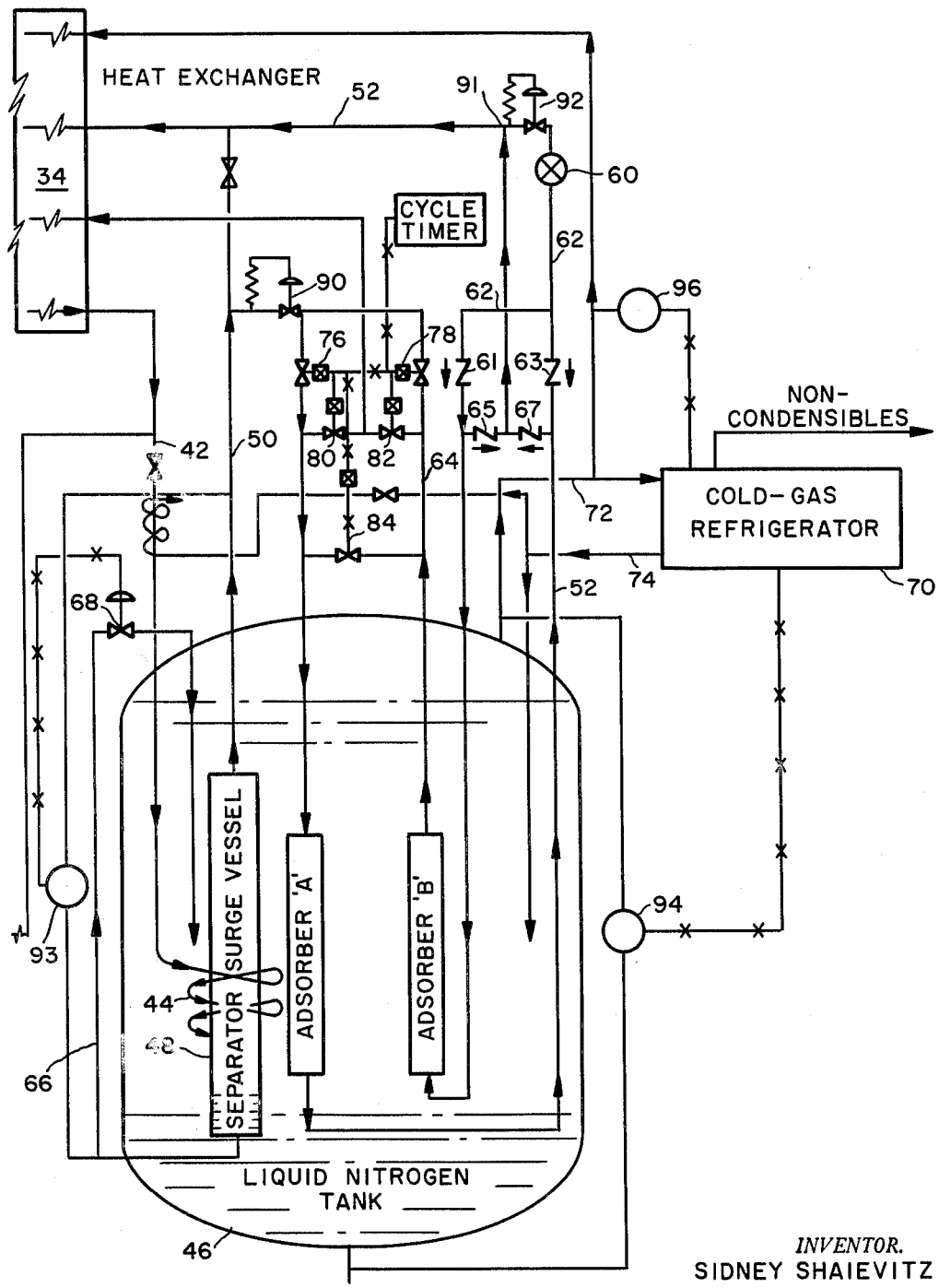

The above and other features, objects and advantages of the present invention will be fully understood from the following description considered in connection with the flow sheet in FIGURES 1 and 2 in the accompanying illustrative drawing in which FIGURE 2 is a continuation of the flow diagram of FIGURE 1.

Referring more particularly to the drawing, a storage tank 10 supplies ammonia to ammonia dissociater 12. Both the storage tank 10 and ammonia dissociater 12 are well known in the art and form no part of the present invention. The dissociated ammonia coming from apparatus 12 is combined with recycled purge hydrogen at 14 and fed through the line 16 to the compressor 18 at a suction pressure of approximately 5 p.s.i.g. The gas mixture or feed which comprises approximately 24% $N_2$ and 76% $H_2$ is then compressed in compressor 18 to approximately 900 p.s.i.a. The compressed gas is conducted through line 20 to aftercooler 22. The compressed gas after being cooled in aftercooler 22 passes through one of two ammonia adsorbers 24 or 26 depending upon the condition of valves 17, 19, 37, 35, 29, 28, 30 and 31. The adsorbers 24 and 26 have an adsorbent therein such as molecular sieves, which are used to remove any traces of undissociated ammonia and moisture that may be present in the feed. These adsorbers are operated cyclically in a manner in which while one adsorber is on stream, the other is being regenerated with nitrogen blowoff. The feed in line 32 is cooled to a few degrees above its dew point by the outgoing gases in the main heat exchanger 34. A defroster-blower 36 and a heater with a thermostat 38 are in line 40, the apparatus having the prime function of defrosting either adsorber 24 or adsorber 26 depending upon which adsorber is on stream. In this connection, if adsorber 24 is on stream and adsorber 26 is to be defrosted, the blower 36 blows the hot stream through open valve 31 into adsorber 26, and thereafter through open valve 29 since valve 30 is closed through line 33 to the vent. In the alternative, if adsorber 24 is to be defrosted the hot stream goes through open valve 35 into adsorber 24, and then through open valve 37 to the vent. A temperature gauge 39 is constructed in a manner to automatically shut off the heater 38 when the desired temperature is reached. Thereafter, only the blower 36 continues to operate which acts to cool down the adsorbers. A secondary function of the defroster blower 36 and the heater with thermostat 38 is to defrost any $NH_3$ that might pass through the adsorbers 24 and 26 and clog line 32. This may be accomplished manually by opening up valve 41.

The feed is thereafter piped out of heat exchanger 34 through line 42 and is brought approximately to liquid nitrogen temperature by flowing through a condensing coil 44 which is immersed in liquid nitrogen in the liquid nitrogen tank 46. At the outlet of coil 44 the nitrogen concentration in the vapor has been reduced from approximately 24% $N_2$ to approximately 7.5% $N_2$. The condensed liquid contains approximately 12.5% dissolved hydrogen. The vapor is separated from the liquid in the separator-surge vessel 48. The vessel 48 is immersed in the liquid nitrogen bath in order to prevent vaporization of the condensate which would result from heat leak. The vapor then flows through line 50 to adsorber A. When the vapor traverses one of the adsorbers A or B practically all of the nitrogen impurities are removed by adsorption, resulting in the generation of ultrapure hydrogen.

The purified hydrogen is split into two fractions. The major portion is fed through product line 52 and rewarmed to nearly ambient temperature in the main heat exchanger 34 and is drawn off from the system at 54 as the hydrogen product. A back pressure valve 56 on the product line 52 maintains pressure in the plant. In order to insure steady operation of the plant, the product is automatically recycled through the valve 58 to the compressor 18 when the product storage is full.

The smaller fraction of the hydrogen is throttled to slightly above atmospheric pressure by the valve 60 and passed through line 62 to regenerate one or the other adsorber A or B. In the present flow sheet the stream is shown regenerating adsorber B, but also may serve to regenerate adsorber A as indicated above. The regeneration in the present system is accomplished at the same temperature as adsorption and is effected by purging the adsorber bed with the generated pure hydrogen at a reduced pressure.

The hydrogen product exiting from the liquid nitrogen tank 46 through line 52 cannot pass through check valve 63, but is directed through check valve 67 and line 52 to product storage. The low pressure, smaller hydrogen fraction which is split off at 91 and throttled in valve 60 is directed through open check valve 61 to adsorber B. It should be apparent that if adsorber A is to be regenerated the smaller hydrogen fraction traverses open check valve 63 and is conducted down line 52 to the adsorber A.

The adsorbers are kept in a liquid nitrogen bath for two reasons: One reason is that the function of the bath is to remove the heat of adsorption, thereby maintaining adsorber A at liquid nitrogen temperatures. If adsorber A is permitted to warm up the result would be a decrease in its adsorptive capacity. The nitrogen bath also serves to remove the refrigeration or "heat" of desorption resulting from the purging of the second adsorber B. Cooling of this adsorber would result in a decrease in its ability to be purged by low pressure gas. The purge gas leaving adsorber B through line 64 contains hydrogen and the nitrogen swept off the bed and is warmed in the main heat exchanger 34 and recycled to the compressor 18.

The liquid nitrogen in the bottom of the separator-surge vessel 48 is continually removed by conduit 66 and automatically throttled in valve 68 into the liquid nitrogen tank 46. Connected to the liquid nitrogen tank 46 is a cold gas refrigerator 70 of the type operated on the reversed Sterling cycle principle. The refrigerator has an intake pipe 72 from the tank 46 and a return pipe 74 to the said tank. It should be apparent that part of the nitrogen and all of the dissolved hydrogen flash to a vapor on expansion of the liquid from the separator-surge vessel. These vapors together with the nitrogen boil-off exit from the tank 46. The gas refrigerator 70 recondenses a portion of the nitrogen vapor and returns it to the tank 46 through return pipe 74. The remaining vapors are warmed in the main heat exchanger 34 and are discharged from the plant. By means of the present process and plant a high hydrogen recovery of approximately 95% is achieved.

The adsorbers A and B are automatically switched over in the following manner: Assuming that adsorber A is at a head pressure of approximately 900 p.s.i.a. and the adsorber B has been purged at a low pressure of approximately 20 p.s.i.a., the switch valves are in the following position: switch valve 76 open, switch valve 78 closed, switch valve 80 closed and switch valve 82 open and switch valve 84 closed. Switching of the adsorbers occurs in two steps: (1) equalization and (2) pressure bulid-up and blow-down. During the first step valves 76, 78, 80 and 82 are closed while valve 84 is opened. This permits adsorbers A and B to equalize in pressure. During the equalization step, pressure is built up in the separator-surge vessel 48. This build-up in pressure must be minimized since the equilibrium nitrogen concentration in the vapor will increase with pressure. Thus, the separator 48 is also designed to function as a surge vessel and thus prevents excessive pressure build-up. The second step in the switching operation is placing the adsorber B on the adsorption part of the cycle and adsorber A on the desorption part of the cycle. In order to accomplish the second step, switch valves 78 and 80 are opened while switch valves 76, 82 and 84 are closed. At this instant adsorber A and adsorber B are both at the same pressure, which is about ½ of the head pressure. Adsorber A then proceeds to blow down while the pressure in adsorber B builds up to operating pressure. A surge tank 86 is installed on the suction side of the compressor 18 to prevent excessive pressure build-up while adsorber A is blowing down. A check valve 88 prevents back flow into the ammonia dissociater 12. A back pressure valve 90 has been inserted between the separator-surge vessel 48 and the switch valves 76–84 inclusive. The function of valve 90 is to maintain the separator at or above normal operating pressure, which in this instance is 900 p.s.i.a. If the valve 90 were not present in the specific location in the system, the reversing of the switch valves would cause the separator-surge vessel 48 to suddenly blow down from its elevated pressure to the equalized pressure of the adsorbers. This would result in flashing of the liquid nitrogen within the separator to give a high nitrogen concentration in the vapor. In addition, the sudden effervescence of the liquid nitrogen may cause foaming. This in turn would lead to liquid carryover to the adsorbers. Both of the above effects will cause fouling of the adsorbers A and B and are avoided by the installation of back pressure valve 90.

Back pressure valve 92 in the line 62 has the function of preventing the on-stream adsorber B from blowing down while it is in the process of pressure build-up. It also prevents the flow of gas to the other adsorber A, which is being blown down prior to being purged.

The liquid level in the liquid nitrogen tank 46 is automatically regulated by a liquid level sensor 94 which controls the on-off operation of the refrigerator 70. A pressure switch 96 will shut off the refrigerator in the event the pressure in the line falls below a prescribed minimum thereby preventing any atmospheric air from being sucked into the nitrogen blowoff line.

It should be noted that in the present process a small quantity of pure nitrogen gas is used as a cold box purge. However, the cold box construction may also be of the vacuum insulated type thereby requiring no purge. The source of pure nitrogen is the condensate from the cold gas refrigerator 70 which exits down pipe 74. Approximately ½ of the refrigeration of this stream is recovered by vaporizing it against the feed at the point where the feed exits from the main heat exchanger 34.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What I claim is:

1. A method of producing high purity hydrogen from dissociated ammonia and including recycling purge hydrogen comprising combining said dissociated ammonia with the recycled purge hydrogen, compressing said mixture, cooling said mixture, passing said mixture through one of two ammonia adsorbers, directing said mixture through a heat exchanger while in heat exchanging relationship with $H_2$ and $N_2$ in the system, piping said mixture from said heat exchanger to a condensing coil immersed in a liquid nitrogen tank whereby both a vapor and a liquid phase of said mixture is formed and in said condensing coil $N_2$ is condensed from the gaseous stream as a liquid leaving the vapor with a higher hydrogen concentration, continually supplying liquid nitrogen to said tank by means of a cold source, separating the vapor from the liquid in a separator-surge vessel located in said tank, a pair of other adsorbers also located in said tank, passing said vapor through one of a pair of said other absorbers in order to remove substantially all the nitrogen impurities therein, directing said high purity hydrogen in the vapor phase out of said adsorber whereby one fraction thereof is piped to one of the other adbsorbers in order to regenerate the same.

2. A method of producing high purity hydrogen from dissociated ammonia as claimed in claim 1 wherein said other fraction of pure hydrogen purges the selected adsorber bed at a reduced pressure.

3. A method of producing high purity hydrogen from dissociated ammonia and including recycling pure hydrogen comprising combining said dissociated ammonia with the recycled purge hydrogen, compressing said mixture, cooling said mixture, passing said mixture through one of two ammonia adsorbers, alternately defrosting said ammonia adsorbers that are not on-stream and additionally defrosting the lines exiting from the ammonia adsorbers if necessary, directing said mixture through a heat exchanger while in heat exchanging relationship with $H_2$ and $N_2$ in the system, piping said mixture from said heat exchanger to a condensing coil immersed in a liquid nitrogen tank whereby both a vapor and liquid phase of said mixture is formed and in said condensing coil $N_2$ is condensed from the gaseous stream as a liquid leaving the vapor with a higher hydrogen concentration, continually supplying liquid nitrogen to said tank by means of a cold source, separating the vapor from the liquid in a separator-surge vessel located in said tank, a pair of other adsorbers also located in said tank, passing said vapor through one of a pair of said other absorbers in order to remove substantially all the nitrogen impurities therein, directing said high purity hydrogen in said vapor phase out of said absorber whereby one fraction thereof is the hydrogen product and the other fraction thereof is piped to one of the other adsorbers in order to regenerate the same.

4. A method of producing high purity hydrogen from dissociated ammonia feed and including recycling pure hydrogen comprising combining said dissociated ammonia with the recycled purge hydrogen, compressing said mixture, cooling said mixture, passing said mixture through one of two ammonia adsorbers, said mixture after separation including nitrogen blowoff, said ammonia adsorbers being operated cyclically in a manner in which while one adsorber is on stream the other adsorber is being regenerated by means of the heated nitrogen blow-off in the system, directing said mixture through a heat exchanger while in heat exchanging relationship with $H_2$ and $N_2$ in the system, piping said mixture from said heat exchanger to a condensing coil immersed in a liquid nitrogen tank whereby both a vapor and a liquid phase of said mixture is formed and in said condensing coil $N_2$ is condensed from the gaseous stream as a liquid leaving the vapor with a higher hydrogen concentration, continually supplying liquid nitrogen to said tank by means of a cold source, separating the vapor from the liquid in a separator-surge vessel located in said tank, a pair of other adsorbers also located in said tank, passing said vapor through one of a pair of said other absorbers in order to remove substantially all the nitrogen impurities therein, directing said high purity hydrogen in the vapor phase out of said absorber whereby one fraction thereof is the hydrogen product and the other fraction thereof is piped to one of the other adsorbers in order to regenerate the same.

5. A dissociated ammonia separating plant comprising a compressor, an ammonia adsorber, conduit means for conducting said compressed gas to said ammonia adsorber, a heat exchanger, pipe means connecting said ammonia adsorber and said heat exchanger, a liquid nitrogen tank having a condensing coil, a separator-surge vessel and a pair of adsorbers immersed in a liquid nitrogen bath therein, a sterling cycle refrigerator cold source for supplying liquid nitrogen to said liquid nitrogen tank, said gas being supplied from said heat exchanger to said condensing coil, said gas being separated into a liquid and vapor in said separator-surge vessel, said vapor being passed through one of the adsorbers in said liquid nitrogen tank to remove substantially all the nitrogen impurities therein, and conduit and valve means for directing the substantially pure hydrogen out of said tank and splitting the same off into two fractions in which one fraction is the hydrogen product and the other fraction is piped to the other of the adsorbers in the liquid nitrogen tank to regenerate the same.

6. A dissociated ammonia separating plant comprising a compressor, an ammonia adsorber, conduit means for conducting said compressed gas to said ammonia adsorber, a heater and thermostat assembly, means connecting said heater and thermostat to said ammonia adsorber to defrost the same and additionally any $NH_3$ exiting from the ammonia adsorber, a heat exchanger, pipe means connecting said ammonia adsorber and said heat exchanger, a liquid nitrogen tank having a condensing coil, a separator-surge vessel and a pair of adsorbers immersed in a liquid nitrogen bath therein, a sterling cycle refrigerator cold source for supplying liquid nitrogen to said liquid nitrogen tank, said gas being supplied from said heat exchanger to said condensing coil, said gas being separated into a liquid and vapor in said separator-surge vessel, said vapor being passed through one of the adsorbers in said liquid nitrogen tank to remove substantially all the nitrogen impurities therein, and conduit and valve means for directing the substantially pure hydrogen out of said tank and splitting the same off into two fractions in which one fraction is the hydrogen product and the other fraction is piped to the other of the adsorbers in the liquid nitrogen tank to regenerate the same.

7. A dissociated ammonia separating plant comprising a compressor, an ammonia adsorber, conduit means for conducting said compressed gas to said ammonia adsorber, a heat exchanger, pipe means connecting said ammonia adsorber and said heat exchanger, a liquid nitrogen tank provided with a liquid nitrogen bath and having a condensing coil, a separator-surge vessel and a pair of adsorbers immersed in said liquid nitrogen bath therein, a sterling cycle refrigerator cold source for supplying liquid nitrogen to said liquid nitrogen tank, said gas being supplied from said heat exchanger to said condensing coil, said gas being separated into a liquid and vapor in said separator-surge vessel, said vapor being passed through one of the adsorbers in said liquid nitrogen tank to remove substantially all the nitrogen impurities therein, and conduit and valve means for directing the substantially pure hydrogen out of said tank and splitting the same off into two fractions in which one fraction is the hydrogen product and the other fraction is piped to the other of the adsorbers in the liquid nitrogen tank to regenerate the same, and means to automatically recycle the hydrogen product to said compressor when the hydrogen product storage is full.

8. A dissociated ammonia separating plant as claimed in claim 5 further comprising a defrosting means for defrosting an ammonia adsorber including a blower, a heater, valve means for permitting a hot stream of gas to traverse said ammonia adsorber countercurrent to the normal flow of the gas mixture to be separated and vent hot stream to the atmosphere, and an automatic heat sensitive means for shutting off said heater when a predetermined temperature has been attained, said blower means continuing to operate after said heater is shut off to thereby cool down said adsorber.

9. A dissociated ammonia separating plant as claimed in claim 6 wherein said heater is provided with a line connecting into said pipe means, a valve in said line whereby a hot stream of gas may selectively be directed into said pipe means to defrost any stray $NH_3$ in said pipe means.

10. In a dissociated ammonia separation plant the improvement comprising a liquid nitrogen tank, a cold source connected to said tank for continually supplying liquid nitrogen thereto to form a liquid nitrogen bath, a pair of alternately operable adsorbers immersed in said liquid nitrogen bath, a conduit supplying a feed gas stream containing impurities to be adsorbed and connected to a first of said pair of adsorbers for adsorbing said impurities, a second adsorber of the pair operating on a regenerative cycle, said pair of adsorbers being in said liquid nitrogen bath to remove the heat of adsorption, and isothermal regeneration means maintained at the same temperature as the first adsorber to effect an alternate purging of said adsorbers with separated pure hydrogen gas.

11. In a dissociated ammonia separation plant as claimed in claim 10 the further improvement comprising a separator-surge vessel immersed in said liquid nitrogen and maintained at a relatively high operating pressure.

12. A dissociated ammonia separating plant as claimed in claim 5 further comprising a plurality of check valves for directing the substantially pure hydrogen out of the tank to the product storage and splitting the exiting hydrogen off into two fractions.

(References on following page)

References Cited by the Examiner

UNITED STATES PATENTS

| | | | |
|---|---|---|---|
| 1,057,052 | 3/1913 | Juye | 62—18 |
| 1,819,498 | 8/1931 | Cole | 55—387 |
| 1,961,201 | 6/1934 | De Baufre. | |
| 2,586,670 | 2/1952 | Lambertsen. | |
| 2,764,877 | 10/1956 | Kohler. | |
| 2,895,303 | 7/1959 | Streeter. | |
| 2,903,859 | 9/1959 | Kahl | 55—387 |
| 2,909,903 | 10/1959 | Zimmermann. | |
| 3,011,589 | 12/1961 | Meyer. | |
| 3,092,461 | 6/1963 | Vander Arend. | |
| 3,109,725 | 11/1963 | Flynn | 62—9 |
| 3,126,266 | 3/1964 | Meisler. | |

OTHER REFERENCES

Bannock: Molecular Sieve Pumping Vacuum, vol. 12, issue March–April 1962, pages 101–106.

NORMAN YUDKOFF, *Primary Examiner.*

V. W. PRETKA, J. JOHNSON, R. C. STEINMETZ,
*Assistant Examiners.*